United States Patent Office 3,792,135
Patented Feb. 12, 1974

3,792,135
PROCESS FOR MANUFACTURING CELLULOSIC REVERSE OSMOSIS MEMBRANES USING A VERY HIGH TEMPERATURE INITIAL AQUEOUS QUENCH
Barry M. Brown and Elbert L. Ray, Rochester, N.Y., assignors to Eastman Kodak Company, Rochester, N.Y.
Filed Jan. 6, 1972, Ser. No. 215,809
Int. Cl. B29d 27/00
U.S. Cl. 264—41       28 Claims

ABSTRACT OF THE DISCLOSURE

Improved processes are disclosed for manufacturing cellulosic "reverse osmosis" membranes, which processes involve the utilization of a very hot initial quench bath, in combination with dope compositions that contain acetic acid, formic acid or mixtures thereof, either with or without other organic solvents.

---

Figure 1:
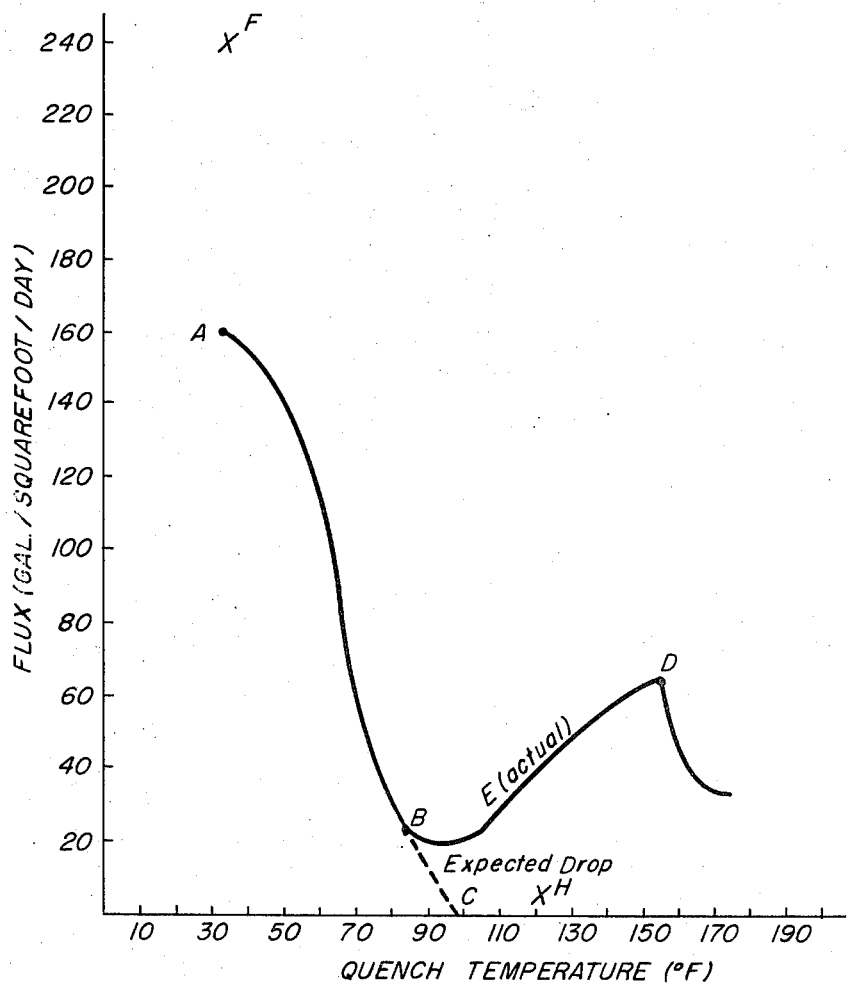

This invention relates to the manufacture of asymmetric cellulosic membranes having the ability to preferentially exclude dissolved salts when used in so-called "reverse osmosis" processes. More particularly, this invention relates to processes for manufacturing cellulosic membranes having high flux combined with an excellent ability to preferentially exclude dissolved salts when the membranes are used in a "reverse osmosis" process.

It is well-known that certain asymmetric cellulosic membranes have a peculiar ability to selectively exclude from passage therethrough dissolved salts when an aqueous solution of such dissolved salts is forced under pressure against the membrane. Such selective exclusion results in purified water passing through the membrane. The processes for purifying water in this way are known as "reverse osmosis" processes, and such membranes are known as "reverse osmosis" membranes.

Cellulosic "reverse osmosis" membranes are made by special processes whereby a peculiar "skin" or layer of selectively effective (for preventing the passage of unwanted dissolved salts through the membrane while simultaneously permitting such passage of purified water) porosity is formed at one surface of the membrane. This "skin" is sometimes termed the "active" layer; the remainder of the membrane usually being very porous with increasing porosity occurring as one proceeds in the direction through the membrane away from the "active" layer. It is apparently this special "skin" that endows these membranes with their valuable selective nature. In turn, the valuable selective nature of useful "reverse osmosis" membranes is apparently dependent upon one or more critical manufacturing process elements such as (1) the particular solvents used in the process (see U.S. Pats. 3,344,214 and 3,497,072), (2) the presence or absence of certain inorganic and organic salts in the casting dope solvent systems (see U.S. Pats. 3,133,132; 3,133,127; 3,432,584 and 3,522,-335), (3) the particular way the membranes are "developed" from dopes that contain the essential materials (see the above patents and U.S. Pats. 3,592,953 and 3,432,585) and (4) even the particular treatment the resulting membranes receive after they are "developed."

In general, however, overall processes for manufacturing useful asymmetric cellulosic "reverse osmosis" membranes have heretofore involved the steps of:

(1) Casting a viscous "dope" in the form of a thin film upon an appropriate casting web (the "dope" or solution generally containing one or more suitable film-forming polymeric materials plus one or more special art-recognized "pore-producing" materials);

(2) Exposing the newly cast film of the dope to air or other suitable gaseous atmosphere for a period of at least about 15 seconds (to thereby somehow cause an incipient change in the exposed surface so that ultimately a microscopically thin "active" layer can be formed thereon);

(3) Subjecting the resulting layer to a treatment with a cool aqueous liquid (usually by immersion of the film in a bath containing mostly water) to thereby cause the dope to "gel" and thus form a membrane having sufficient integral strength to retain its physical shape and structure upon being removed from the casting web (this step is known as the initial "quench" step); and (4) Subjecting the washed membrane to a special heat treatment (which step is known at the "heat tempering" step), in which the salt rejecting properties of the membrane are increased apparently because of a general shrinkage of the membrane during heat tempering.

It is known, for example, that certain polymeric film-forming materials such as cellulose esters and ethers perform optimally in such processes to manufacture commercially practical and useful "reverse osmosis" membranes. Also, only certain organic solvents have been found useful in such processes and apparently only a limited number of materials can function as acceptable "pore-producing" materials. Of the many organic solvents that have been utilized in such overall processes as those described above in the manufacture of cellulosic reverse osmosis membranes, it has been found that acetone (U.S. Pats. 3,344,214 and 3,432,585), acetic acid, formic acid, methyl formate (Dept. of Engineering, University of California at Los Angeles, Progress Report July 1, 1962 to Dec. 31, 1962 on "Sea Water Demineralization by Means of a Semipermeable Membrane" by S. Leob and U.S. Pat. 3,283,042) and mixtures of acetone with other solvents such as acetic acid (U.S. Pat. 3,522,335) and dioxane, methanol, methyl ethyl ketone, tetrachloroethane and the like (U.S. Pat. 3,497,072) are generally useful, with those containing acetone being preferred heretofore, possibly because of the relatively high volatility of acetone combined with its excellent miscibility with cold water (during the initial cool water "quench" step of the conventional processes).

It is noteworthy that these overall prior art processes contain four separate steps, each step having to be substantially completed prior to the outset of the next step. In view thereof, it can be readily appreciated that the elimination of one or more "steps" from these processes is a desirable objective. Heretofore, apparently, efforts to eliminate one or more of such "steps" have been largely unsuccessful. As a matter of fact, with but one exception to date, disclosures in the prior art of processes of the general type described above have required that in order to obtain cellulosic ester or ether "reverse osmosis" membranes having commercially practical or acceptable "salt rejection" properties, it is necessary to "temper" or "anneal" the membranes (in step 4 above) for several minutes in hot water (for example, at temperatures of 70° C. to about 90° C.) or in some other suitable "tempering" medium. Otherwise, the membranes are generally extremely porous, having very high "flux" (water through-put) values, but relatively low "salt rejection" properties. Such low "salt rejection" properties detract from the usefulness of membranes for "reverse osmosis" processes for removing dissolved salts from water. The "exception" just referred to relates to the processes disclosed in U.S. Patent 3,432,584 in which the "annealing step" is carried out by immersing the water-swollen membrane in "a polar, water-miscible, organic compound or an aqueous solution thereof." Noteworthy, however, is the fact that the processes of this patent do require an "annealing step" subsequent to the "cold water immersion step."

Efforts to improve and/or simplify such membrane processes as those set out above are continuing in research and development laboratories throughout the world, as is evidenced by the issuance, for example, of U.S. Pat. 3,592,953 in which a method is disclosed for performing the initial aqueous "quench" step (step 3 of the above described process) at room or ambient temperature rather than the "usual" very low temperatures that had been generally believed to be necessary. The method of these patentees required the presence of a fairly high vapor pressure of acetone in the atmosphere over the cast dope prior to the intial quench step. These patentees also professed to have obviated the necessity of a heat-tempering step (such as step 4 above). However, it is noteworthy that the claims of U.S. Pat. 3,592,953 do require the inclusion of such a "heat tempering" step. Also of interest is the fact that whereas the membranes resulting from the process of these patentees are effective in excluding divalent "water hardness" ions such as calcium and magnesium, the membranes have apparently only a minimal ability to "exclude" such difficult-to-exclude (smaller) ions as sodium and chloride ions. Thus, in a test for "salt exclusion" as is required for consideration of a given membrane as a candidate of interest for purifying sea water or fairly heavily salt (NaCl) contaminated brackish water via the most desirable single-pass reverse osmosis procedure, membranes made via the process of U.S. Pat. 3,592,053 would rate relatively low, although they can be used successfully to exclude divalent ions at relatively low fluxes.

Thus there has existed heretofore a need for significantly simplified process for manufacturing cellulosic reverse osmosis membranes having the ability to exclude, among others, Na and Cl ions to a very high degree, while the membranes simultaneously exhibit a high level of "flux" (or through-put) under commercially practical use conditions such as about 600 p.s.i. applied pressures.

It has now been discovered that, surprisingly, by using a very hot initial water "quench" (rather than the relatively cold water that was used heretofore), it is possible not only to eliminate the subsequent "hot water tempering" step (step 4 as detailed in the above description of conventional, processes for manufacturing commercially useful cellulosic reverse osmosis membranes) but also to make cellulosic reverse osmosis membranes on a commercial scale having better flux and salt rejection properties than was heretofore believed possible.

Thus, the processes of the present invention comprise the following steps in the order given:

(1) Casting onto a casting web an appropriate concentrated "dope" of a film-forming cellulose ester in the form of a film;
(2) exposing the resulting cast solution very briefly to air or some other gaseous atmosphere to thereby cause the incipient formation of the requisite "active" layer on the exposed surface; and
(3) immersing the resulting "exposed" still fluid film into a hot aqueous quench bath (to thereby cause the layer of dope to set up or "gel" and form a porous asymmetric membrane; the present processes differing mainly from conventional reverse osmosis manufacturing processes in that the water into which the "exposed" liquid film is immersed (immediately after the very brief atmospheric exposure) be at an elevated temperature of from about 100° F. to about 180° F.

It is believed surprising that hot water can be at all useful in the "initial water immersion step" because heretofore in order to make an acceptable "reverse osmosis" membrane, it was believed necessary to immerse the "exposed" membrane into either very cold water (see, for example, page 65 in the book "Desalination by Reverse Osmosis," M.I.T. Press, 1966, edited by V. Merten, where even a "room temperature" water "quench" is said to be generally undesirable), or at best, room temperature (see U.S. Pat. 3,592,953).

Figure 2:
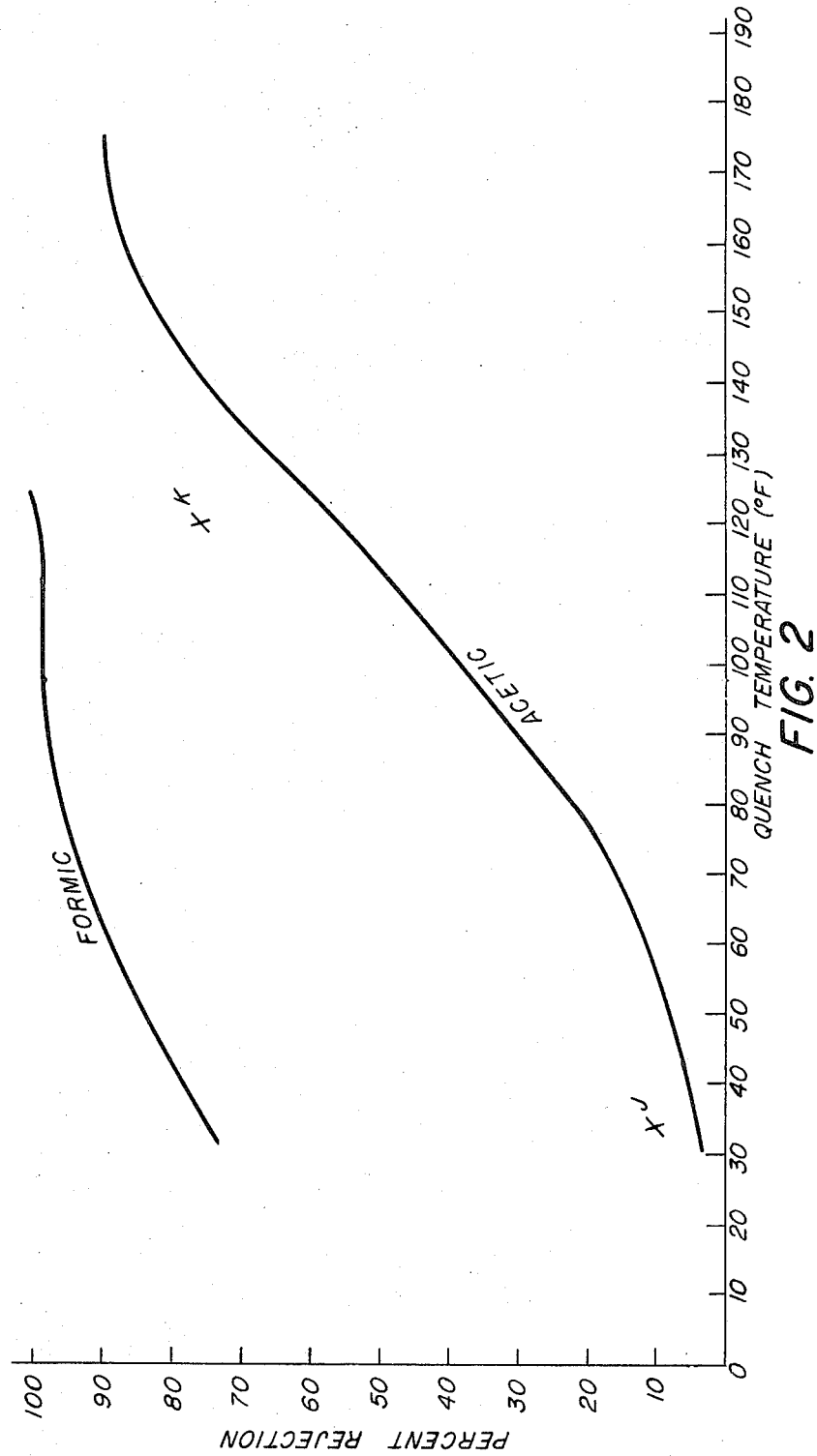
Figure 3:
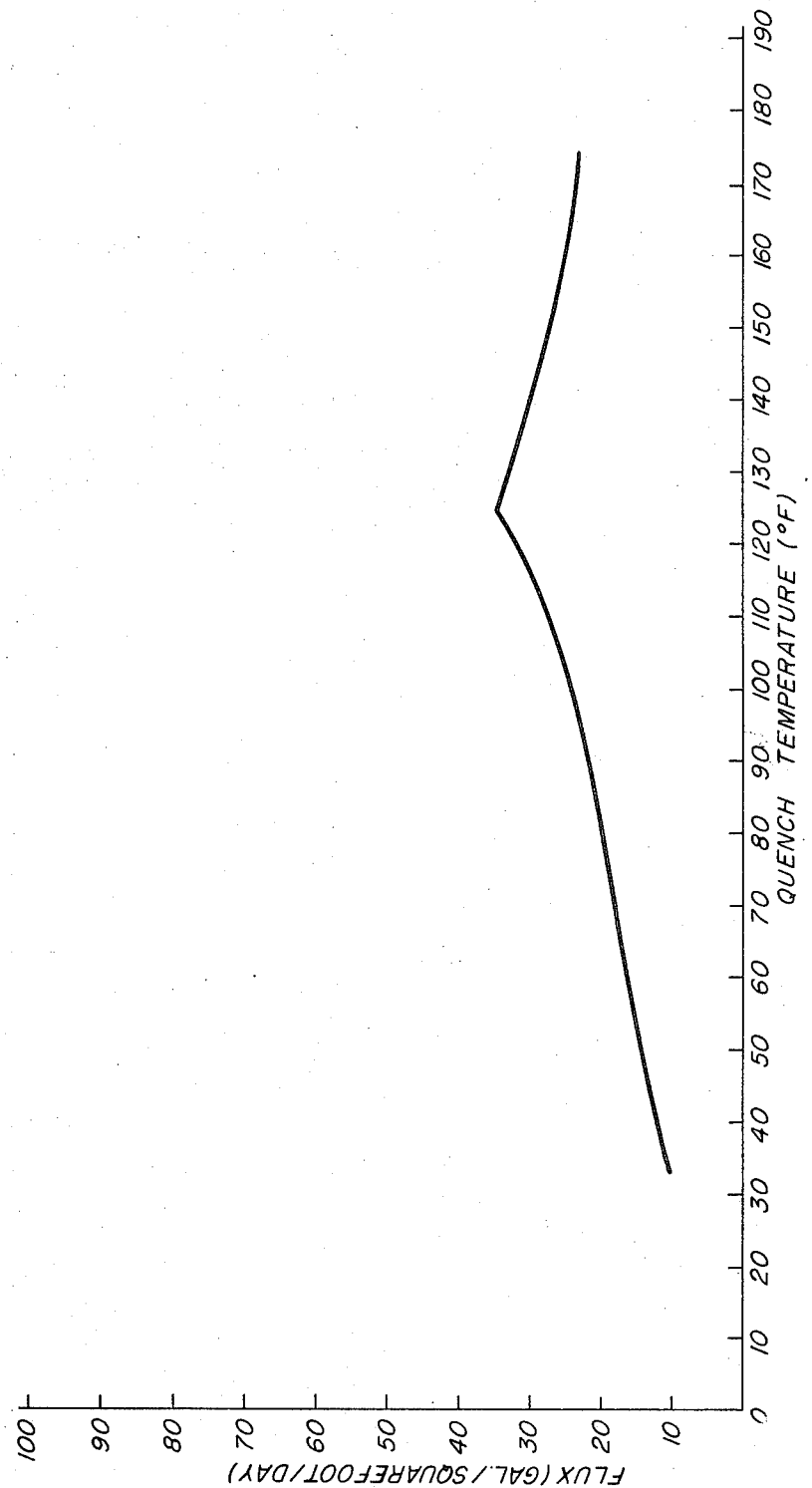

Reference to the accompanying drawings will result in a better appreciation of the unexpected nature of the present invention. Thus, in FIG. 1 is shown the relationship between "flux" and the temperature of the "initial aqueous quench" bath for a given cellulose acetate dope formulation. "Flux" is the amount of purified water, stated in gallons, under 600 p.s.i. of pressure which passes through a square foot of membrane in 24 hours when 0.5% NaCl water is forced against the "active" surface. In FIG. 2, the curve labeled "acetic" illustrates the relationship between (a) the actual "salt exclusion" or "rejection" efficiency of the membranes illustrated in FIG. 1 and (b) the temperature of the initial aqueous quench bath. The curve labeled "formic" in FIG. 2 refers to a formulation in which a substantial portion of the organic solvent is formic acid. Points "J" and "K" in FIG. 2 represent NaCl rejection efficiency of membranes prepared using cellulose acetate dissolved in an acetone/formamide blend, according to the formulations set out in U.S. Pat. 3,133,132. The curve in FIG. 3 illustrates the relationship between "flux" and the temperature of the initial aqueous quench bath for membranes made when formic acid is substituted for acetic acid in the example, below.

Referring now to FIG. 1, it can be seen that as one proceeds from an "initial quench" temperature of 34° F. to an ambient or room temperature initial quench (that part of the curve in the drawing designated AB), it was apparent that the "flux" of the membrane decreased drastically (from about 160 gallons to below about 20 gallons). Since it was also presumed that a subsequent "heat tempering" step was necessary (to improve the "salt rejection" ability of the membrane to above about 95%), and since the "flux" would be expected to be considerably lower after such a "heat tempering" step, it was reasonable to expect that still higher initial quench bath temperatures would result in membranes having still lower "flux" values (as illustrated by dashed line BC in FIG. 1), thereby being of still lower potential value to users of "reverse osmosis" membranes.

However, it has now been discovered that, rather than continuing to diminish along an "expected" pathway (BC in FIG. 1), for some as yet unexplained reason, the "flux" property of cellulosic membranes made in acetic acid/acetone solvent media surprisingly is spontaneously reversed in its downward undesirable direction (shown by the BD portion of the curve in FIG. 1) at an "initial quench" temperature of about 100° F. and thereafter (through to about 190° F.) has a significantly improved (increased) level. Since, within this temperature range, the "salt rejection" abilities of the membranes are also substantially higher (better) than those resulting from the use of conventional "initial quench" temperatures (see FIG. 2), the value of the use of the very high "initial quench" temperatures of the present invention can readily be appreciated.

Note that the "salt rejection" data illustrated in FIG. 2 resulted from membranes that were not subjected to any "heat tempering" step. Thus the use of the very high "initial quench" temperatures of the present invention can result, if desired, in the elimination of a subsequent "heat tempering" step (which step heretofore was believed necessary to manufacture cellulosic reverse osmosis membranes having NaCl "rejection" values above about 50%).

Apparently, the many benefits that can result from using the very high temperature "initial quench step" aspect of the present invention can be accrued only to those who use cellulosic dopes that contain as the organic solvent fraction, an effective amount of acetic acid, formic acid or a mixture of acetic and formic acids. Thus, when an initial high temperature quench (120° F.) was applied to a cellulosic dope such as that of Loeb (U.S. Pat. 3,133,132) in which acetone and formamide were the solvents, only very low flux values resulted (point "H" in FIG. 1). Similar results would be expected from membranes made according to Ward and Kapp (U.S. Pat. 3,592,953) in which acetone and water served as the solvent medium. Evidently, using the types of prior art dope formulations represented by these Loeb and Ward et al. formulas cannot result in the unexpectedly excellent results that can be obtained in accordance with the present invention. Point "F" in FIG. 1 is the "flux" of a typical "Loeb type" membrane that was initially quenched at 34° F.

The special concentrated dopes that can be used in the successful practice of the present invention must contain, dissolved therein in the form of a clear, viscous solution, at least one film-forming cellulose ester, ether or mixed ester ether. The film former(s) must be dissolved in an appropriate solvent blend which will vary to some extent in character depending upon the particular cellulosic material and pore-producing material that is utilized in the preparation of the desired dope composition. Thus, whereas it is preferred that the cellulosic film-forming material be a lower fatty acid ester of cellulose (in which the lower fatty acid ester groups contain from 2 to 5 carbon atoms) such as cellulose acetate, cellulose propionate, cellulose butyrate, cellulose acetate propionate, cellulose valerate, and cellulose acetate butyrate (and cellulose acetate is still further preferred), all having intrinsic viscosities of at least about 0.5 and degrees of substitute of at least about 2.2, it is believed that film-forming cellulose ethers and mixed ether esters of cellulose that can dissolve to the extent of at least about 10 weight percent in the organic solvent fraction of the present dope compositions can also be used satisfactorily in the present processes.

The cellulosic film-forming material(s) described above should comprise at least about 10 weight percent of the present dope compositions and preferably should represent from about 15 to about 33 weight percent of the dope compositions. It is also preferred that the weight ratio of cellulosic film former to total organic solvent in these dopes be between about 1.2 and about 1.3, respectively. Other non-volatile material can also be present in the present dope compositions. The most noteworthy of such other than film-forming materials are the so-called "pore-producing materials." "Pore-producing materials" are well-known in the reverse osmosis membrane manufacturing art and need not be treated exhaustively here, except by way of example to point out that this term includes such materials as magnesium perchlorate, inorganic iodides, bromides, salicylates, chlorates, tetraiodomercurates, thiocyanates, fluosilicates, effective amine salts of strong acids and even triphenyl boron, as well as other materials that are sufficiently soluble (to the extent of at least about 0.02 weight percent at usage temperatures) in the dope compositions. Such "pore-producing materials" function in their well-known capacity to, somehow, contribute to the overall effectiveness of the resulting membranes to function effectively in the "reverse osmosis" process.

Preferred "pore-producing materials" for use in the dope compositions which perform optimally in the present processes are the effective "pore-producing" amine salts of strong acids, as set out in detail in U.S. Pat. 3,522,335 issued to Martin E. Rowley on July 28, 1970 (the disclosure of which is incorporated herein by reference). Preferred pore-producing amine salts include the pore-producing hydrohalide, nitrate, sulfate, and phosphate salts of organic amines such as dipyridine sulfate, ditriethylammonium sulfate, ditriethanolammonium sulfate, triethanolamine phosphate, di(2-aminoethanol) sulfate, N,N-dimethylaniline sulfate and the like. Preferred amine sulfates are those in the amine: sulfate equivalent ratio is about 2:1, respectively.

Other non-volatile (at 105° C.) materials, such as plasticizers, antioxidants, surfactants, dyes and the like, can also be present in minor amounts dissolved in the cellulosic dopes that are useful in the practice of the present invention. However, it is preferred that such materials constitute at most about 10 weight percent of the total non-volatile fraction of such dopes, whereas the cellulosic film former(s) and pore-producing materials jointly constitute substantially all of the remainder. It is preferred, for example, that the pore-producing material be present at a level of at least about 0.02 and preferably at levels of from about 5 to about 35 weight percent, based upon the total weight of cellulosic film-forming material(s) in the dopes. Similarly, the weight ratio of cellulosic material(s) to total solvent material in these dopes can vary within a wide range, but preferably should be within the range of from about 1:2 to about 1:4, respectively.

The organic solvent fraction of the useful dopes apparently must contain at least an effective amount of acetic and/or formic acid. They can also contain one or more additional volatile (at 105° C. under ambient pressure) organic solvents such as acetone, methanol, ethanol and the like; such additional volatile organic solvent(s) being miscible with hot water (>100° F.) and being effective cosolvents (with acetic and/or formic acid) for the dissolution of the other essential components of the dope composition. It is preferred in the practice of the present invention to use blends of acetic and/or formic acid with acetone, preferred weight ratios being from about 20:80 to about 80:20, of acid:acetone, respectively. Water in minor amounts, preferably less than about 2 weight percent, can also be present in these dopes. Generally some water accompanies formic acid into dopes that contain this material.

The amount of time the cast layer of the dope is "exposed" to the atmosphere (in step 2 of these processes) before it is quenched in the very hot aqueous "initial quench" bath can be varied to some extent, as has been practiced heretofore in corresponding "exposure" steps in conventional "reverse osmosis membrane" manufacturing processes. Preferably, such exposure should be for at most about 120 seconds; just enough for the "incipient" formation of the "active" layer, but not long enough to solidify the surface of the cast film.

The initial aqueous "quench bath" into which the cast films are immersed after the short "development" step contains at least about 50 weight percent (preferably at least about 75 weight percent) of water, and can also contain relatively small amounts of the water miscible and water soluble components present in the dope compositions. They must have sufficient dissolving power to effectively extract at least half of the solvent(s) and pore-producing material(s) from the gelled membrane during the relatively brief period of time when the membrane remains immersed in the hot aqueous initial quench bath. Such brief period of time will depend upon such factors as the speed at which the particular solvent(s) and other water soluble materials in the gelled dope composition can be extracted therefrom into the aqueous bath, as well as the extent of such extraction that is desired. Generally the immersion time in the hot "initial aqueous quench bath" should be at least about 5 seconds (subsequent washing and additional extraction can be undertaken at some later time and at lower temperatures, if desired), and will preferably be at least about 30 seconds to about 150 seconds, but can also be longer.

In the practice of the initial casting step of the present processes, generally films of dope having thicknesses of from about 0.5 to about 20 mils are cast, however, preferable thicknesses include those within the range of from about 1 to about 8 mils.

In the following examples, all parts given are by weight unless otherwise specified.

EXAMPLE

Dope preparation (A) To 1864 parts of glacial acetic acid were slowly added 940 parts of triethylamine. After the resulting mixture was cooled to 20° C., 480 parts of 95% sulfuric acid were added slowly with stirring. The resulting ditriethyl ammonium sulfate ("TEA sulfate") solution was cooled to room temperature before use.

(B) Into 7500 parts of a 40:60 (by volume) mixture of acetone and acetic acid were dissolved 2500 parts of a commercial grade of cellulose acetate (containing 39.8% acetyl and 3.6% hydroxyl and having an "acetone" intrinsic viscosity of 1.15 and 1375 parts of the TEA sulfate solution prepared in paragraph (A) above. This mixture was blended until a smooth, clear, fairly viscous solution was formed.

Membrane manufacture

The dope formulation prepared as in paragraph (B) above was coated using conventional film-casting equipment as a fluid film about 6 mils thick onto the surface of a slowly moving belt of biaxially oriented poly(ethylene terephthalate) having a conventional hydrophilic copolymeric "sub" coating (as per U.S. Pat. 3,636,150) on its surface. The resulting cast film was exposed to dry 22° C. air for 30 seconds and then immersed immediately into the initial quench bath which consisted essentially of water. (The temperature of the initial quench bath was varied between 34° F. and 175° F. over several experiments.) Whereas no visible change in the nature of the cast dope layer was observed during the brief air exposure step (herein also called the "development" step), the cast dope is observed to become opaque practically immediately upon immersion into the initial aqueous quench bath having temperatures of about 45° F. or more. Indeed, after only about 60 seconds in the initial quench bath, the gelled cellulose acetate membrane has achieved sufficient integral strength so that it can be readily separated from the casting web. The membrane product can then be continuously wound upon a wind-up roll, if desired.

Practically identical procedures should be followed when formic acid is substituted for acetic acid in the foregoing example. Results from such formic acid usage appear in FIGS. 2 and 3. When formic acid/acetone blends constitute the organic solvent, optimum initial quench temperatures of from about 115 to about 135° F. (preferably about 125° F.) can be used for best results.

From the foregoing example, it can be seen that the present invention can be practiced using basically the same mechanical or manipulative procedures in the (1) casting, (2) developing, (3) and initial quenching steps as has been known heretofore. In the practice of the present invention, however, very high temperatures (from about 100° F. to about 190° F.) must be utilized in the initial aqueous quench step. If desired in the generic practice of this invention, the "heat tempering" step (which must be used in practically all processes known heretofore for manufacturing reverse osmosis membranes having "flux" values of more than 10 gallons and sodium chloride "rejection" values of more than 50% can be eliminated. This fact becomes increasingly evident from a study of the cuves in FIG. 2. Note that if one desires to make a fairly "high flux" reverse osmosis membrane having "rejection" values of from about 65% to about 96% without subjecting the membrane to a heat tempering step, he can utilize formulations containing acetic acid as the main acidic component of the solvent system (in combination with acetone in this instance), whereas if he desires a fairly "high flux" membrane (without using the separate heat tempering step) that yields extremely high "rejection" data, the acid portion of the solvent system should be formic acid. It is believed that the use of mixtures of formic acid and acetic acid will result in data between those shown in FIG. 2 for "acetic" and "formic" acid formulations.

Actually, the particular combination of (i) formic acid usage in the dope, (ii) cellulose acetate being essentially the only film-forming component in the dope and (iii) use of the very high initial aqueous quench bath temperatures, in accordance with the practice of the present invention, result in the formation of unique, extremely valuable membranes which yield surprising excellent "reverse osmosis" results as illustrated by the "formic" curve in FIG. 2. Thus, membranes having an unexpectedly thin "active" layer, an unexpectedly open or extremely porous integral "support" portion (thereby yielding very high "flux" data) and very surprising "sodium chloride rejection" data can be manufactured [by combining (i), (ii), and (iii)]; whereby, as a result thereof, such membranes have the ability to convert sea water to potable water at practical through-put levels and in a single "pass." A NaCl rejection value of at least 98.6% is necessary to accomplish this task. Apparently there is some unexpected chemical interaction between the cellulose acetate and the formic acid during this aspect of the present processes (when the acid in the solvent portion of the dope compositions of this invention consists essentially of formic acid) so that a unique membrane having many unexpectedly valuable "reverse osmosis" properties results. Such membranes have an extremely porous sub-surface and contain at least about 1 weight percent (based upon the total weight of cellulose ester) of combined formyl. These membranes are the main subject of a separate patent application by the present inventors, Ser. No. 215,810, filed Jan. 6, 1972 concurrently herewith, the disclosure of which is hereby incorporated by reference into the present patent application.

It has also been discovered that, by use of the "very high initial temperature aqueous quench" step of the present processes; in this instance at a temperature of from about 100° F. to about 190° F.; still another unexpected result can be obtained, provided that the solvent portion of the cellulosic dope compositions consists essentially of formic acid (a small amount of water is usually carried into the dope with the formic acid). Thus, by using (a) a solvent that consists essentially of formic acid and (b) the very high initial aqueous quench temperatures set out above, not only can the conventional "heat tempering" step be eliminated, but also the so-called "development" step can be practically eliminated, if desired. This particular development is the subject of a separate patent application by the present inventors, Ser. No. 215,811, filed Jan. 6, 1972 concurrently herewith and the disclosure of which is hereby incorporated by reference into the present patent application.

The invention has been described in detail with particular reference to preferred embodiments thereof, but it will be understood that variations and modifications can be effected within the spirit and scope of the invention.

We claim:

1. A process which consists essentially of the steps of (a) casting in the form of a liquid film a concentrated dope onto a casting web, (b) exposing said liquid film to a gaseous atmosphere for a sufficient period of time to develop an incipient active layer at the surface exposed to said gaseous atmosphere, and (c) subsequently substantially immediately after development of said layer immersing the resulting developed liquid film for a period of from at least about 5 seconds and long enough to cause the dope to set into an aqueous initial quench bath containing at least about 50 weight percent of water; the temperature of said quench bath being between about 100° F. and about 190° F.; said concentrated dope being comprised of a blend of at least one cellulosic film former selected from the group consisting of soluble film-forming cellulose esters, ethers and mixed ester ethers, and at least one pore-producing material; said blend being dissolved in a volatile, water miscible solvent portion which consists essentially of an effective amount of acetic acid, formic acid or mixture of acetic and formic acids; said cellulosic film former and said pore-producing material being present in said dope in an amount equal to at least about 10 weight percent and at least about 0.02 weight percent, respectively.

2. A process as in claim 1, wherein said cellulosic film former is a cellulose ester having a degree of substitution of from 1.5 to 3 and an intrinsic viscosity of at least about 0.5; the ester portion of said cellulose ester containing from 2 to 5 carbon atoms of a lower fatty acid group.

3. A process as in claim 2, wherein the acid fraction of said solvent portion consists essentially of acetic acid.

4. A process as in claim 3, wherein acetone is also present in said solvent portion; the weight ratio of said acetic acid to said acetone being from about 1:4, respectively.

5. A process as in claim 4, wherein said cellulose ester is cellulose acetate.

6. A process as in claim 5, wherein said pore-producing material is an effective pore-producing amine salt of a strong acid.

7. A process as in claim 3, wherein said pore-producing material is selected from the group consisting of pore-producing hydrohalide, nitrate, sulfate and phosphate salts of organic amines.

8. A process as in claim 6, wherein said effective pore-producing material is selected from the group consisting of dipyridine sulfate, triethylamine sulfate, triethanolamine sulfate, N,N-dimethylaniline sulfate, 2 - amino-ethanol sulfate, picoline sulfate and lutidine sulfate; the ratio of amine to sulfate of these sulfate salts being about 2:1, respectively.

9. A process as in claim 8, wherein said material is triethylamine sulfate.

10. A process as in claim 8, wherein said material is dipyridine sulfate.

11. A process as in claim 8, wherein said material is triethanolamine sulfate.

12. A process as in claim 2, wherein said solvent portion contains a mixture of acetic acid and formic acid.

13. A process as in claim 12, wherein acetone is also present in said solvent portion mixture; the weight ratio of acetone to the combined weights of said acetic and formic acids in said mixture being from about 1:4 to about 4:1, respectively.

14. A process as in claim 13, wherein said cellulose ester is cellulose acetate.

15. A process as in claim 14, wherein said pore-producing material is an effective pore-producing amine salt of a strong acid.

16. A process as in claim 15, wherein said effective pore-producing amine salt of a strong acid is selected from the group consisting of dipyridine sulfate, triethylamine sulfate, triethanolamine sulfate, N,N-dimethylaniline sulfate, 2-aminoethanol sulfate, picoline sulfate and lutidine sulfate; the ratio of amine to sulfate of these sulfate salts being about 2:1, respectively.

17. A process as in claim 16, wherein said amine salt is triethylamine sulfate.

18. A process as in claim 16, wherein said amine salt is pyridine sulfate.

19. A process as in claim 16, wherein said amine salt is triethanolamine sulfate.

20. A process as in claim 2, wherein the acid fraction of said solvent portion consists essentially of formic acid.

21. A process as in claim 20, wherein acetone is also present in said solvent portion; the weight ratio of said formic acid to said acetone being from about 1:4 to about 4:1, respectively.

22. A process as in claim 21, wherein said cellulose ester is cellulose acetate.

23. A process as in claim 22, wherein said pore-producing material is an effective pore-producing amine salt of a strong acid.

24. A process as in claim 23, wherein said effective pore-producing amine salt of a strong acid is selected from the group consisting of dipyridine sulfate, triethylamine sulfate, triethanolamine sulfate, N,N-dimethylaniline sulfate, 2-amino-ethanol sulfate, picoline sulfate and lutidine sulfate; the ratio of amine to sulfate of these sulfate salts being 2:1, respectively.

25. A process as in claim 24, wherein said amine salt is triethylamine sulfate.

26. A process as in claim 24, wherein said amine salt is dipyridine sulfate.

27. A process as in claim 24, wherein said amine salt is triethanolamine sulfate.

28. A process for manufacturing a cellulose acetate reverse osmosis membrane, which process consists essentially of the following steps in the order given:
   (a) casting a dope composition onto a casting web in the form of a liquid film having a thickness of from about 0.5 to about 20 mils;
   (b) exposing the resulting liquid film to ambient air for about 30 seconds;
   (c) substantially immediately after said exposing quenching the resulting exposed liquid film in hot water having a temperature of from about 115 to about 135° F. for a period of from about 5 to about 150 seconds; and
   (d) separating the resulting reverse osmosis membrane from said casting web;
   said dope composition comprising a clear solution of at least about 10 parts by weight of cellulose acetate containing about 40 percent acetyl and about 2 parts of di-triethylammonium sulfate in about 35 parts of a blend of about 40:60 parts by volume of (i) acetone and (ii) an acid selected from the group consisting of acetic acid, formic acid and mixtures thereof.

References Cited
UNITED STATES PATENTS

| | | | |
|---|---|---|---|
| 3,522,335 | 7/1970 | Rowley | 264—49 |
| 3,283,042 | 11/1966 | Loeb et al. | 264—49 |

DONALD E. CZAJA, Primary Examiner

M. I. MARQUIS, Assistant Examiner

U.S. Cl. X.R.

210—321, 500; 264—49

UNITED STATES PATENT OFFICE
CERTIFICATE OF CORRECTION

Patent No. 3,792,135　　　　　　　　Dated  February 12, 1974

Inventor(s) Barry M. Brown and Elbert L. Ray

It is certified that error appears in the above-identified patent and that said Letters Patent are hereby corrected as shown below:

Column 3, line 25, "3,592,053" should read "3,592,953";
Column 5, line 23, "substitute" should read "substitution";
Column 9, line 11, (claim 4), after "1:4" insert -- to about 4:1 --
Column 10, line 18, (claim 24), after "being" insert "about".

Signed and sealed this 6th day of August 1974.

(SEAL)
Attest:

McCOY M. GIBSON, JR.　　　　　　C. MARSHALL DANN
Attesting Officer　　　　　　　　Commissioner of Patents